United States Patent Office 3,539,641
Patented Nov. 10, 1970

3,539,641
N'-SUBSTITUTED N-ARYLSULFONYL-UREAS
Henri Dietrich, Arlesheim, Basel-Land, Switzerland, assignor to Geigy Chemical Corporation, Ardsley, N.Y., a corporation of New York
No Drawing. Filed June 22, 1967, Ser. No. 647,913
Claims priority, application Switzerland, June 23, 1966, 9,137/66
Int. Cl. A61k 27/00; C07c 143/82
U.S. Cl. 260—397.7                 7 Claims

ABSTRACT OF THE DISCLOSURE

N-arylsulfonylcarbamoyl - aminocarboxylic acid tert. alkyl esters which have useful hypoglycaemic action and intermediates for their production; therapeutical compositions containing these esters and processes of producing a hypoglycaemic effect in a mammal. An illustrative embodiment is tert. butyl N-[(p-tolylsulfonyl)-carbamoyl]-glycinate.

DETAILED DISCLOSURE

The invention relates to N'-substituted N-arylsulfonyl ureas having valuable pharmacological properties. More particularly, the invention pertains to N-arylsulfonylcarbamoylaminocarboxylic acid tert. alkyl esters and to pharmaceutically acceptable salts thereof with bases which have hypoglycaemic action. The invention is further concerned with processes for the production of these compounds and these pharmaceutically acceptable salts as well as with intermediates used in said processes. Furthermore, the invention relates to therapeutical compositions consisting essentially of (1) a pharmacologically active compound according to the invention or a pharmaceutically acceptable salt thereof with a base and (2) a pharmaceutical carrier, and also to processes of producing a hypoglycaemic effect in a mammal by administering to said mammal a therapeutically effective amount of a N'-substituted N-arylsulfonyl urea according to the invention or of a pharmaceutically acceptable salt thereof with a base.

Compounds of the Formula I $$X{-}C_6H_4{-}SO_2{-}NH{-}CO{-}NH{-}\underset{R_2}{\overset{R_1}{C}}{-}CO{-}O{-}\underset{CH_3}{\overset{R_4}{C}}{-}R_3$$

(I)

wherein

X represents hydrogen, halogen up to the atomic number 35, amino, lower alkyl, lower alkoxy or lower alkanoyl,
$R_1$ represents hydrogen, lower alkyl or lower alkylthiomethyl,
$R_2$ represents hydrogen or lower alkyl, and
$R_3$ and $R_4$ represent lower alkyl, as well as their pharmaceutically acceptable salts with inorganic or organic bases, have not been known up to now.

In the compounds of Formula I, the symbol X may be in the o-, m- or p-position. As lower alkyl, X, $R_1$, $R_2$, $R_3$ and $R_4$ may be, e.g. methyl, ethyl, propyl, isopropyl, butyl, isobutyl, sec. butyl, tert. butyl, pentyl, isopentyl or 2,2-dimethyl-propyl. Also, X and $R_1$ may represent the following: X as lower alkoxy e.g. methoxy, ethoxy, isopropoxy, butoxy, isobutoxy, sec. butoxy, tert. butoxy, pentoxy, isopentoxy, and 2,2-dimethyl-propoxy and, as lower alkanoyl e.g. acetyl, propionyl, 2-methylpropionyl, butyryl, 2-methylbutyryl and 3-methyl-butyryl, and $R_1$ as lower alkylthiomethyl e.g. methylthiomethyl, ethylthiomethyl, propylthiomethyl, isopropylthiomethyl, butylthiomethyl, isobutylthiomethyl, sec. butylthiomethyl, tert. butythiomethyl, pentylthiomethyl, isopentylthiomethyl adn 2,2-dimethylpropylthiomethyl.

These compounds as well as their pharamaceutically acceptable salts with inorganic or organic bases have on oral or parenteral administration a hypoglycaemic action which characterises them as suitable for the treatment of diabetes. The hypoglycaemic action of the new compounds is surprising because, according to H. Ruschig et al., Arzneimittelforschung, 8, 449 (1958), N'-substituted (p-alkyl- or p-alkoxy-phenylsulfonyl)-ureas, the N'-substituent being a hydrocarbon radical which is substituted by carboxylic acid ester groups, do not have a hypoglycaemic action. The following esters of primary alkanols are named from among the examples there given of pharmacologically inactive compounds: ethyl N-[(p-tolylsulfonyl)-carbamoyl]-glycinate and ethyl [(p-tolylsulfonyl)-carbamoyl]-leucinate. Our own findings also show that n-butyl N-[(p-tolylsulfonyl)-carbamoyl]-glycinate, which is related to these compounds, does not have a hypoglycaemic action.

Of special interest are those compounds of the invention which have the formula $$X{-}C_6H_4{-}SO_2{-}NH{-}CO{-}NH{-}CH_2{-}CO{-}O{-}\underset{CH_3}{\overset{CH_3}{C}}{-}CH_3$$

(Ia)

wherein X represents hydrogen, halogen up to the atomic number 35 or lower alkyl, as well as their pharmaceutically acceptable salts with inorganic or organic bases.

Representative compounds within this scope which have been found to have hypoglycaemic action to a favorable degree are particularly the following: tert. butyl N-[(p-tolylsulfonyl)-carbamoyl]-glycinate, and tert. butyl N-[(p-chlorophenylsulfonyl)-carbamoyl]-glycinate.

Merely by way of illustration, the hypoglycaemic action of tert. butyl N-[(p-tolylsulfonyl)-carbamoyl]-glycinate, for instance, is determined as follows: the substance is suspended in tap water with the aid of tragacanth and is administered by means of a stomach sound in an amount of 200 mg./kg. of body weight. Six rabbits of an average weight of 2 kg. which have not been fed for 24 hours before the start of the test, are used as test animals. Blood samples are taken from the ear vein of the animals immediately before, and 1, 2, 3½, 7, 10 and 24 hours after, administration of the test substance. After the next to the last blood sample is taken, i.e. 10 hours after administration of the test substance, the test animals are again fed normally. The blood sugar is determined according to Hagedorn-Jensen, Biochemische Zeitschrift, 135, 46 (1923).

Tert. butyl N-[(p-tolylsulfonyl)-carbamoyl]-glycinate causes in this test a prolonged, about 46% reduction of the blood sugar.

A compound of the Formula I is produced according to the invention by reaction an aminocarboxylic acid ester of the Formula II $$H_2N{-}\underset{R_2}{\overset{R_1}{C}}{-}CO{-}O{-}\underset{CH_3}{\overset{R_4}{C}}{-}R_3$$

(II)

wherein $R_1$, $R_2$, $R_3$ and $R_4$ have the meanings given in Formula I, with a phenylsulfonyl isocyanate of the Formula III $$X'{-}C_6H_4{-}SO_2{-}N{=}C{=}O$$

(III)

wherein X' has the meaning of X given in Formula I or it represents a group which can be converted by reduction into the amino group, or with a reactive functional derivative of a phenylsulfonyl carbamic acid of the Formula IV

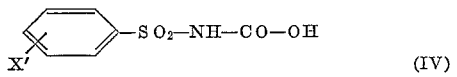
(IV)

wherein X' has the meaning given in Formula I or III, the reaction optionally being performed in the presence of condensing agent and/or solvent, and, optionally, converting a compound obtained the group X' of which can be converted into the amino group, by reduction, into an N'-substituted N-amino-phenylsulfonyl urea and, if desired, converting the compound obtained into a salt with an inorganic or organic base.

Examples of reactive functional derivatives of phenylsulfonyl carbamic acids of Formula IV are their halides, particularly chlorides, their lower alkyl esters and also the phenyl esters. Also amides, lower alkylamides, dialkylamides, diphenylamides and also N-acylamides are suitable.

The reaction is performed, for example, in the cold or by heating in an inert organic solvent. Suitable inert organic solvents are, e.g. hydrocarbons such as benzene, toluene or xylene, ether-type liquids such as diethyl ether, dioxane or tetrahydrofuran, chlorinated hydrocarbons such as methylene chloride, and lower ketones such as acetone or methylethyl ketone.

The reaction of an isocyanate, carbamic acid ester or urea can also be performed in the absence of a solvent. Also, in general, no condensing agent is necessary; if desired, however, a tertiary organic base can be used as such, e.g. in the reaction of an isocyanate; however, the isocyanate can also be used in the form of an addition product with a tertiary organic base.

A carbamic acid halide is reacted with an alkyl glycinate of the formula II preferably in the presence of an acid binding agent. As such, inorganic bases or their salts with weak acids are used, e.g. an alkali hydroxide, acetate, hydrogen carbonate, carbonate or phosphate, such as sodium hydroxide, sodium acetate, sodium hydrogen carbonate, sodium carbonate and sodium phosphate or the corresponding potassium compounds. In addition, also calcuim oxide, carbonate and also calcium phosphate and magnesium carbonate can be used. Instead of inorganic bases or salts, also organic bases are suitable such as pyridine, trimethylamine or triethylamine, N,N-di-isopropylethylamine or collidine. In excess, these can also be used as solvents.

The subsequent conversion of the group X' of the reaction product into the free amino group, which converts this into a compound of Formula I, is preformed by reduction.

An example of such group X' which can be converted into the amino group is the nitro group. The intermediate N'-substituted N-nitrophenylsulfonyl ureas corresponding to Formula I wherein X=X'=nitro are new and form part of the invention.

In general, this radical X' can be reduced catalytically, e.g. by means of hydrogen in the presence of Raney nickel, palladium or platinum charcoal, in an inert organic solvent such as ethanol.

Examples of starting material are glycine esters or isocyanates of the Formula II or III which are substituted according to the groups X', $R_1$, $R_2$, $R_3$ and $R_4$ explicitly mentioned following Formula I. Other suitable starting materials are, e.g. chlorides, methyl, ethyl and phenyl esters, also methyl, dimethyl, diphenyl, acetyl and benzoyl amides of N-phenyl-sulfonyl carbamic acid of Formula IV which are substituted corresponding to the definition of the group X' given above. Starting materials of these types are described in the literature.

The new active substances or pharmaceutically acceptable salts thereof are preferably administered orally. Inorganic or organic bases can be for salt formation such as alkali or alkaline earth hydroxides, carbonates or bicarbonates, triethanolamine, choline, $N^1$-dimethyl- and $N^1$-($\beta$-phenylethyl)-biguanide. The daily dosages vary between 15 and 150 mg./kg. for mammals. Suitable dosage units such as dragées (sugar coated tablets) or tablets, preferably contain 100–500 mg. of an active compound according to the invention, actually 20 to 80% of a compound of Formula I. They are produced by combining the active substance, e.g. with solid pulverulent carriers such as lactose, saccharose, sorbitol, mannitol; starches such as potato starch, maize starch or amylopectin, also laminaria powder or citrus pulp powder; cellulose derivatives or gelatine, optionally with the addition of lubricants such as magnesium or calcium stearate or polyethylene glycols of suitable molecular weights, to form tablets or dragée cores. The latter are coated e.g. with concentrated sugar solutions which can also contain e.g. gum arabic, talcum and/or titanium dioxide, or with a lacquer dissolved in easily volatile organic solvents or mixtures of solvents. Dyestuffs can be added to these coatings, e.g. to distinguish between different dosages of active substance.

The following prescriptions further illustrate the production of tablets and dragées:

(a) 1,000 g. of tert. butyl N-[(p-tolylsulfonyl)-carbamoyl]-glycinate are mixed with 550 g. of lactose and 292 g. of potato starch. The mixture is moistened with an aqueous solution of 8.0 g. of gelatine and granulated through a sieve. After drying, 60.0 g. of potato starch, 60.0 g. of talcum, 10.0 g. of magnesium stearate and 20.0 g. of colloidal silicon dioxide are mixed in and the mixture is pressed into 10,000 tablets each weighing 200 mg. and containing 100 mg. of active substance. If desired, the tablets can be grooved for better adaptation of the dosage.

(b) A granulate is produced from 1,000 g. of tert. butyl N-[(p-chlorophenylsulfonyl)-carbamoyl]-glycinate, 379 g. of lactose and the aqueous solution of 6.0 g. of gelatine. After drying, the granulate is mixed with 10.0 g. of colloidal silicon dioxide, 40.0 g. of talcum, 60.0 g. of potato starch and 5.0 g. of magnesium stearate and the mixture is pressed into 10,000 dragée cores.

These are then coated with a concentrated syrup made from 533.5 g. of crystallised saccharose, 20.0 g. of shellac, 75.0 g. of gum arabic, 250 g. of talcum, 20 g. of colloidal silicon dioxide and 1.5 g. of dyestuff and dried. The dragées obtained each weigh 240 mg. and contain 100 mg. of active substance.

The following non-limitative examples further illustrate the invention. The temperatures are given in degrees centigrade, percentages are given by weight.

EXAMPLE 1

13.1 g. of tert. butyl glycinate are added to 19.7 g. of p-tolylsulphonyl isocyanate in 40 ml. of abs. toluene. The temperature of the mixture rises. When the exothermic reaction is complete, the solution is cooled to 0° whereupon the crude product crystallises out. It is filtered off under suction, washed twice with 50 ml. of petroleum ether each time and recrystallised from ethanol. The pure tert. butyl N-[(p-tolylsulphonyl)-carbamoyl]-glycinate obtained melts at 157–158°.

EXAMPLE 2

The following compounds are produced analogously to Example 1; from 13.1 g. of tert. butyl glycinate:

(a) With 21.7 g. of p-chlorophenyl sulphonyl isocyanate, tert. butyl N-[(p-chlorophenylsulphonyl)-carbamoyl]-glycinate M.P. 166–167° from benzene, (b) With 20.1 g. of p-fluorophenylsulphonyl isocyanate, tert. butyl N-[(p-fluorophenylsulphonyl)-carbamoyl]-glycinate, M.P. 140–141.5° from methanol, and (c) With 18.3 g. of phenylsulphonyl isocyanate, tert. butyl N-[(phenyl-sulphonyl)-carbamoyl]-glycinate, M.P. 145–146°.

EXAMPLE 3

18.1 g. of (1,1-dimethyl-propyl) glycinate hydrochloride are suspended in 100 ml. of anhydrous toluene and 7.8 g. of anhydrous pyridine and 19.7 g. of p-tolylsulphonyl isocyanate are added to the suspension. An exothermic reaction takes place and a clear solution is formed which separates into two phases. The solution is stirred for 5 minutes, cooled to 0° and 100 ml. of ice water are added whereupon a colourless precipitate is formed. The crystals obtained, when recrystallised from methanol, yield (1,1-dimethylpropyl) N-[(p-tolylsulphonyl)-carbamoyl]-glycinate, M.P. 134–135°.

EXAMPLE 4

The following are obtained analogously to Example 3:

(a) From 21.7 g. of p-chlorophenylsulphonyl isocyanate and 18.1 g. of (1,1-dimethylpropyl) glycinate hydrochloride in 7.9 g. of pyridine and 100 ml. of toluene, (1,1-dimethylpropyl) N - [(p-chlorophenylsulphonyl)-carbamoyl]-glycinate, M.P. 159–160° from methanol;

(b) From 20 g. of p-tolylsulphonyl isocyanate and 18.2 g. of tert. butyl α-alaninate hydrochloride in 8.8 g. of pyridine and 100 ml. of toluene, tert. butyl N-[(p-tolylsulphonyl)-carbamoyl]-α-alaninate, M.P. 137–138° from methanol;

(c) From 21.7 g. of p-chlorophenylsulphonyl isocyanate and 18.2 g. of tert., butyl α-alaninate hydrochloride in the same mixture of solvents as (b), tert. butyl N-[(p-chlorophenylsulphonyl)-carbamoyl] - α - alaninate, M.P. 129–131° from ethanol/water;

(d) From 19.7 g. of p-tolylsulphonyl isocyanate and 19.5 g. of tert. butyl 2-methyl-α-alaninate hydrochloride in the same mixture of solvents as (b), tert. butyl N-[(p-tolylsulphonyl)-carbamoyl]-2 - methyl-α-alaninate, M.P. 181–182° from acetone, and (e) From 21.8 g. of p-chlorophenylsulphonyl isocyanate and 19.5 g. of tert. butyl 2-methyl-α-alaninate hydrochloride in the same mixture of solvents as (b), tert .butyl N-[(p-chlorophenylsulphonyl)-carbamoyl] - 2 - methyl-α-alaninate, M.P. 191.5° from acetone.

EXAMPLE 5

(a) 35.9 g. of tert. butyl N-[(p-nitrophenylsulphonyl)-carbamoyl]-glycinate in 400 ml. of dioxane are hydrogenated with hydrogen in the presence of Raney nickel, hydrogenation being performed at 20° under normal pressure until no more hydrogen is taken up. The catalyst is then filtered off under suction, washed with dioxane and the filtrate is concentrated in vacuo. Ethanol previously heated to 60° is added to the residue whereupon the crude product crystallises. It is filtered off under suction and the crude product is washed with ethanol. Recrystallised from isopropanol, the tert. butyl N-[(p-aminophenylsulphonyl)-carbamoyl]-glycinate obtained melts at 143–144°.

(b) The starting substance of (a) is obtained by heating 22.8 g. of p-nitrophenylsulphonyl isocyanate in 35 ml. of toluene at 60°. The solution obtained is cooled to 30° and 13.1 g. of tert. butyl glycinate ester are added whereupon the temperature of the reaction mixture rises to 50°. After this has coled to 0° the crude product crystallises out. It is filtered off under suction and washed with toluene. Recrystallisation from methanol yields pure tert. butyl N-[(p-nitrophenylsulphonyl)-carbamoyl] - glycinate, M.P. 133–134°.

EXAMPLE 6

(a) 37.3 g. of tert. butyl N-[(p-nitrophenylsulphonyl)-carbamoyl]-α-alaninate in 600 ml. of dioxane are hydrogenated at 20° and normal pressure with hydrogen in the presence of palladium charcoal. The catalyst is filtered off under suction, washed with dioxane and the dioxane solution is concentrated in vacuo. Crystallisation of the residue from methanol yields tert. butyl N-[(p-aminophenylsulphonyyl)-carbamoyl]-α-alaninate, M.P. 110–112°.

(b) The starting substance of (a) is obtained analogously to Example 3 by reacting 22.8 g. of p-nitrophenylsulphonyl isocyanate with 18.2 g. of tert. butyl α-alaninate hydrochloride in the presence of 7.8 g. of pyridine. When crystallised from methanol, the tert. butyl N-[(p-nitrophenylsulphonyl)-carbamoyl]-α-alaninate melts at 149–151°.

EXAMPLE 7

A solution of 23 g. of tert. butyl 3-tert. butylthio-α-alaninate in 200 ml. of dioxane is added to 23 g. of p-methoxyphenylsulphonyl urea which has been dissolved in 600 ml. of 80° hot dioxane. The reaction mixture is refluxed for 5 hours, ammonia being given off. The solution is then concentrated in vacuo and petroleum ether is added whereupon the crude product crystallises. The crystals are filtered off under suction and recrystallised from ethanol. The pure tert. butyl N-[(p-methoxyphenylsulphonyl)-carbamoyl]-3 - tert. butylthio-α-alaninate obtained melts at 129–131°

EXAMPLE 8

Starting with 13.1 g. of tert. butyl glycinate, the following end products are obtained analogously to Example 7:

(a) With 21.4 g. of o-tolylsulphonyl urea, tert. butyl N-[(o-tolylsulphonyl)-carbamoyl]-glycinate, M.P. 151–152° (from ethanol);

(b) With 21.4 g. of m-tolylsulphonyl urea, tert. butyl N-[(m-tolylsulphonyl)-carbamoyl]-glycinate, M.P. 178–179°;

(c) With 21.4 g. of p-tolylsulphonyl urea, tert. butyl N-[(p-tolylsulphonyl) - carbamoyl] - glycinate, M.P. 157–158° (from ethanol). From its melting point and that of this compound mixed with the compound obtained according to Example 1, it is identical with that compound;

(d) With 23.45 g. of m-chlorophenylsulphonyl urea, tert. butyl N-[(m-chlorophenylsulphonyl)-carbamoyl]-glycinate, M.P. 173–174° (from isopropanol);

(e) With 21.5 g. of p-sulphanilyl urea, tert. butyl N-[(p-aminophenylsulphonyl)-carbamolyl]-glycinate, M.P. 143–144°. From its melting point and that of this compound mixed with the compound obtained according to Example 5(a), it is identical with that compound; and (f) With 24.2 g. of p-acetylphenylsulphonyl urea, tert. butyl N-[(p-acetyl) - phenylsulphonyl) - carbamoyl]-glycinate.

What is claimed is:

1. A compound selected from the group consisting of a sulfonylurea of the formula:

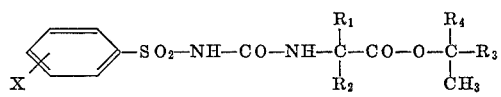

wherein

X is hydrogen, halogen up to the atomic number 35, amino, lower alkyl, lower alkoxy or lower alkanoyl;

$R_1$ is hydrogen, lower alkyl, lower alkoxy or lower alkanoyl;

$R_2$ is hydrogen or lower alkyl; and each of $R_3$ and $R_4$ is lower alkyl;

and a pharmaceutically acceptable salt thereof with a base.

2. A compound according to claim 1, wherein said sulfonylurea is of the formula:

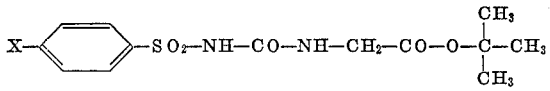

wherein X is hydrogen, halogen up to the atomic number 35 or lower alkyl.

3. A compound according to claim 2 wherein said sulfonylurea is tert. butyl N-[(p-tolylsulfonyl)-carbamolyl]-glycinate.

4. A compound according to claim 2 wherein said sulfonylurea is N-[(p-chlorophenylsulfonyl)-carbamoyl]-glycinate.

5. A sulfonylurea of the formula:

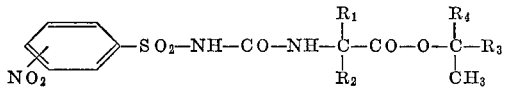

wherein $R_1$ is hydrogen, halogen up to the atomic number 35, amino, lower alkyl, lower alkoxy or lower alkanoyl;
$R_2$ is hydrogen or lower alkyl; and
$R_3$ and $R_4$ are lower alkyl.

6. A sulfonylurea according to claim 5 which is tert. butyl N-[(p-nitrophenylsulfonyl)-carbamoyl]-glycinate.

7. A sulfonylurea according to claim 5 which is tert. butyl N-[(p-nitrophenylsulfonyl)-carbamoyl]-α-alaninate.

References Cited

Ruschig et al: Arzneimittelforschung, vol.. 8, pp 448–54 (1958).

Georgiev: Compt. Revd. Acad. Bulgare Sci., vol. 14, pp. 603–6 (1961).

Benn et al.: J. Chem. Soc., 1964, 3395–404.

HENRY R. JILES, Primary Examiner

C. M. SHURKO, Assistant Examiner

U.S. Cl. X.R.

260—470; 424—228, 309